Jan. 18, 1927.  
R. L. FRANCIS  
1,615,075  
HYDRAULIC STEERING MECHANISM  
Filed Jan. 18, 1926  2 Sheets-Sheet 1
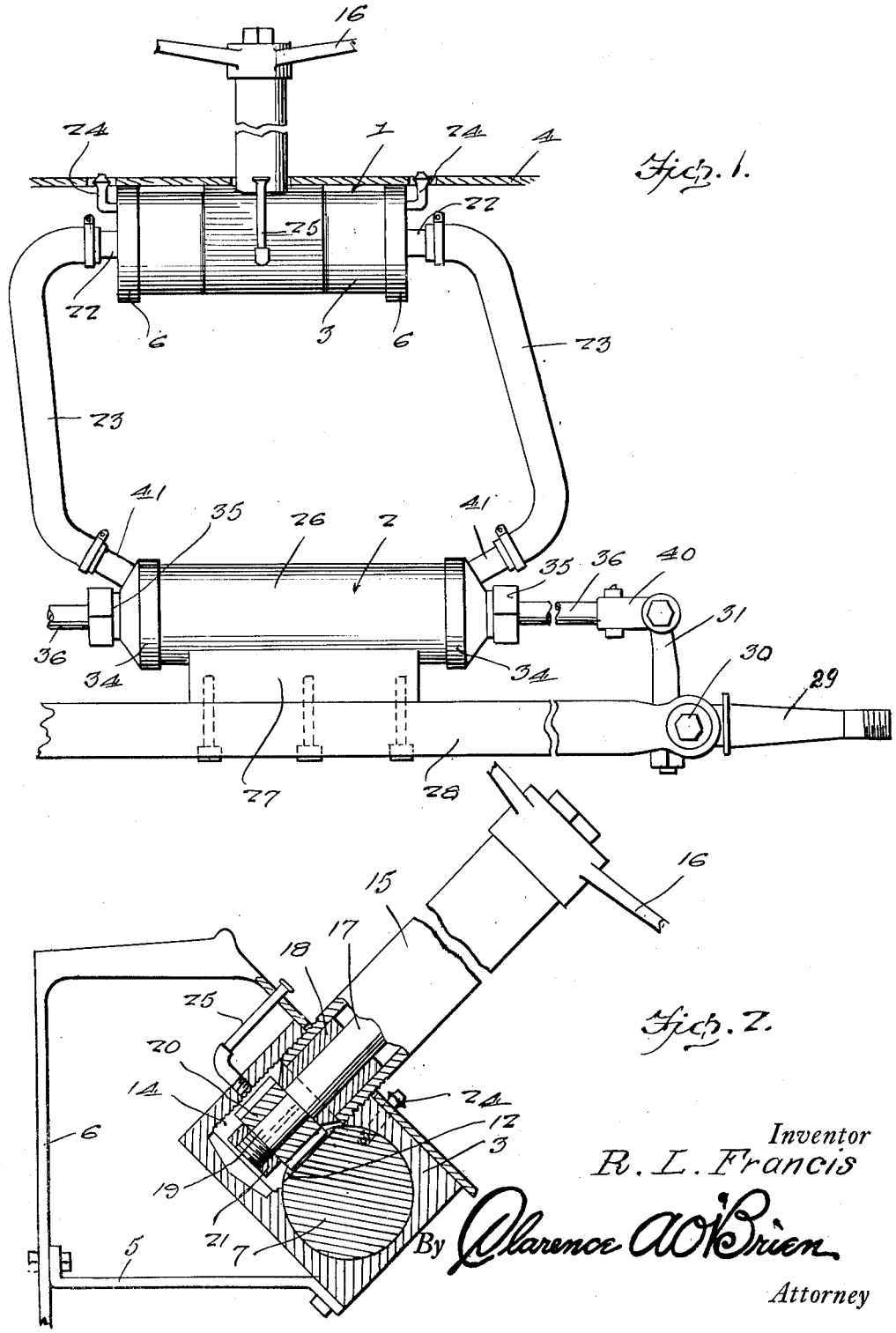
Inventor  
R. L. Francis  
By Clarence A. O'Brien  
Attorney

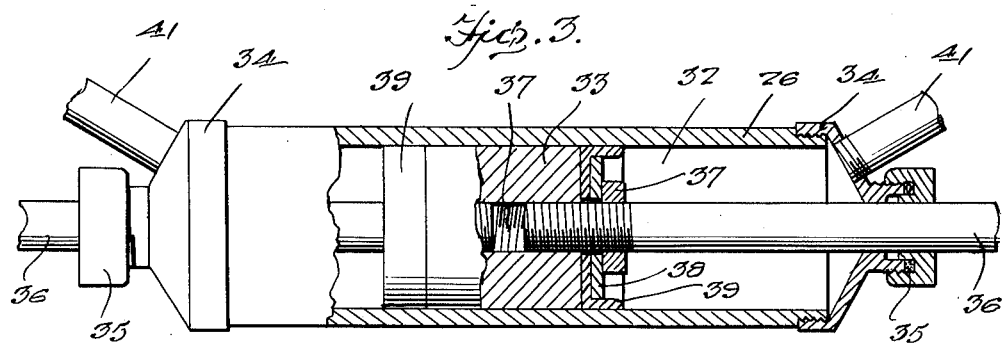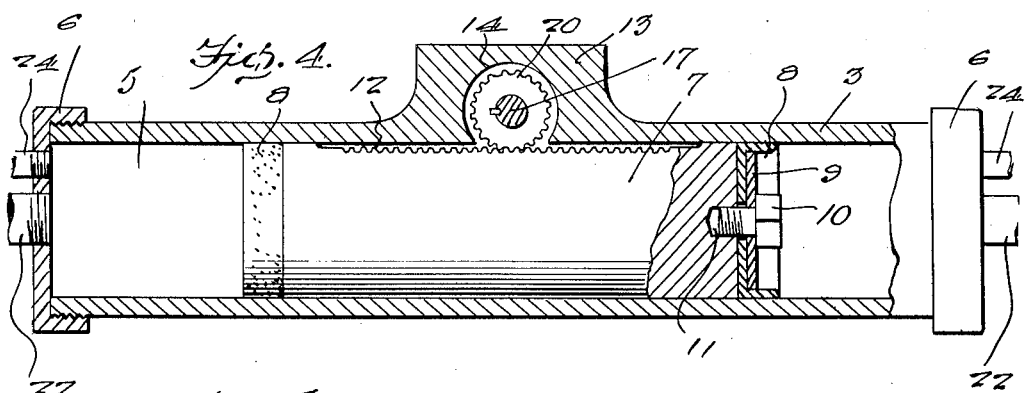

Patented Jan. 18, 1927.

1,615,075

UNITED STATES PATENT OFFICE.

ROBERT L. FRANCIS, OF HENDERSONVILLE, NORTH CAROLINA.

HYDRAULIC STEERING MECHANISM.

Application filed January 18, 1926. Serial No. 82,089.

This invention relates to improvements in hydraulic automobile steering mechanism.

An object of the invention is to simplify the construction, cost and operation of a steering mechanism for automobiles, and increase the efficiency of operation thereof, by providing a hydraulic mechanism having suitable means attached to the steering arm operable by a manually operated control mechanism adapted to operate the wheels at the will of the driver of the automobile.

A further object of the invention is to provide a simple and efficient construction mounted on the instrument board of an automobile, and manually operable for controlling and operating a suitable contained fluid adapted to transmit the motion to the steering mechanism of the automobile, and operate the same to produce the desired turning movement, the fluid pressure being adapted to absorb the shocks applied to the steering mechanism and equalize the stresses thereon, thereby preventing the application of such stresses to the manually operable mechanism and the steering wheel thereof.

The invention further comprehends the provision of a hydraulic steering mechanism for automobiles, which will efficiently operate the steering mechanism for steering the automobile under all conditions of operation upon a substantially reduced leverage ratio between the manually operable control mechanism and the mechanism for operating the steering arm of the steering wheel.

This invention comprehends still further objects residing in the particular relation and construction of parts for carrying out the invention in the most expeditious manner, which are more particularly pointed out in the following detailed description, and in the claims directed to a preferred form of construction, it being understood, however, that various changes in the arrangement and construction of these parts may be made without departing from the spirit and scope of the appended invention as herein set forth.

In the drawings forming part of this application:

Figure 1 is a view indicating the improved steering mechanism in assembled relation and showing its associated relation with the front axle of the motor vehicle.

Fig. 2 is a vertical sectional view through the manually operated mechanism showing the manner of mounting the same on the instrument board of the motor vehicle for proper operation.

Fig. 3 is a horizontal sectional view through the device for operating the steering gear showing portions in elevation.

Fig. 4 is a longitudinal sectional view thru the plunger and housing of the manually operated controlling mechanism with portions shown in elevation.

Fig. 5 is a plan view of an axle and spring construction showing a modified form of steering mechanism for the wheel.

Fig. 6 is a vertical transverse section thru the construction shown in Fig. 5.

The improved hydraulic steering mechanism of this invention includes a manually operable control unit 1 which is adapted to control and operate the steering gear operating unit 2 for transmitting motion to and operating the steering gear of the automobile in a desired manner.

The control unit 1 includes a cylinder 3 which is directly mounted on the under side of the instrument board 4 of the automobile, and has a suitable brace connection 5' with the dash board 6. This cylinder block 3 is formed with a cylindrical bore 5 which is closed at the opposite ends of the block by the caps 6. A control piston 7 is reciprocable in the cylindrical bore and has piston cups 8 secured to the opposite ends thereof through the medium of the washers 9 and bolts 10 which are threadedly mounted in threaded recess 11 in the end of the piston.

One side of the piston 7 is formed with a flattened portion extending longitudinally thereof provided with rack teeth 12. The central portion of the control cylinder block 3 is formed with a laterally extending portion 13 which is formed with a bore 14 having the axis extending laterally to the axis of the cylindrical bore 5 and at one side thereof, said bores communicating and the bore 14 having an open threaded end receiving the steering column 15.

The cylinder block 3 is mounted on the under side of the dash board 4 which is formed with an opening in registry with the bore 14 to permit the passage of the steering column 15 therethrough for mounting in the cylinder block in the manner shown in Fig. 2. The steering wheel 16 is rotatably mounted on the end of the steering column 15 and is secured to the steering rod 17 having the ends rotatable in the bearing sleeve

18 in the lower end of the steering column and provided with a reduced extension 19 on which is secured the pinion 20 intermeshing with the rack teeth 12 on the control piston 7. A suitable lock nut 21 secures the pinion 20 on the steering rod 17.

The end cap 6 threadedly receives suitable nipples 22 which carry the flexible hose connection 23, for conducting the fluid from the control unit to the steering gear operating unit. Pressure valve fittings 24 are mounted in each end cap and extend laterally from the control unit, projecting through suitable openings in the instrument board 4 to permit the attachment of a pump for supplying oil to the unit under pressure. These valves may be of any desired type shown in the art. An oil tube 25 is also connected to the cylinder block 3 for conducting oil into the bore 14 for lubricating the pinion 20.

Steering gear operating units 2 include a cylinder block 26 formed with an extension 27 to provide a seat adapted to fit the axle 28 of the automobile. This is preferably the front axle which pivotally mounts the stub axle 29 on the spindle bolt 30, the stub axle being provided with a steering arm 31 connected with the steering gear, and forming parts thereof, so that the automobile may be suitably steered by the operator of this gear.

The operating cylinder 26 is formed with a cylindrical bore 32 which receives the operating piston 33 for reciprocating movement therein. The bore 32 extends longitudinally through the body and at the opposite ends the cylinder block receives the caps 34 which are formed with packing glands 35 for preventing leakage around the operating rods 36 slidably extending through openings in the caps and said glands.

The operating piston 33 is formed with a threaded axial bore 37 which threadedly receives the operating rods 36 in the opposite ends thereof on which are mounted the lock nuts 37 adapted to lock the washers 38 and the piston cups 39 on the end of the piston body 33. These ports cooperate so that the operating rods 36 are adjustably locked in connection with the piston 33 by the lock nut 37 which additionally operates in locking the operating rod against movement and to rigidly mount the piston cup on the body 33.

The ends of the operating rod 36 are pivotally connected by the usual fitting 40 with the steering arm 31 of the spindle and stub axle structure. Nipples 41 are threadedly mounted in the sides of the caps and receive the hose connection 23 from the nipple 22.

With this construction, oil is preferably used as the operating fluid and completely fills the hose connections and the cylindrical bores of the control units and the operating units beyond the ends of the piston cups so as to provide two separated bodies of fluid operable in the movement of the control piston 7 to produce a corresponding movement of the operating piston 33. In this way, the rotation of the steering wheel will apply a pressure to the fluid in the control unit in the movement of the control piston 7, and correspondingly operate the operating piston 33 for transmitting motion through the operating rods 36 to the steering arm 31, for rotating the stub axles on the main axle 28, and thereby effecting the steering operation of the vehicle equipped therewith.

With this construction, it will be seen that there is a substantially great leverage ratio which permits a resultant easy operation of the steering wheel, at the same time operating the steering mechanism with precision under all conditions of resistance. With a construction of this character, very little effort is required in the operation of the steering mechanism to steer a motor vehicle under the varying conditions in driving.

In addition, the stresses applied to the steering mechanism through the operating rod 36 are absorbed and distributed by the fluid so that the vibration is not transmitted to the steering wheel as in the case of steering apparatus now in use. This is due to the fact that the starting movement of the fluid is considerably slower than the vibrations of the steering mechanism, so that the fluid will equalize and distribute all stresses.

In view of the length of operating rods 36, in comparison with the relatively small size of the operating unit 2, advantage is taken of the flexibility of these rods for compensating the movement occasioned by the pivotal connection with the arm 31 extending to produce a lateral displacement of these operating rods.

The operating unit shown in Figs. 5 and 6 is constructed and operates so as to eliminate the use of packing glands which are subject to leakage in a device of this character, and include a cylinder block 45 mounted in any suitable and desired manner on the front axle 46 at the outside of the spring 47, and which has a cylindrical bore open in one end, and closed by the cap 48. The central top portion of the cylinder block 45 is formed with an elongated slot 49 communicating with the cylindrical bore and through which extends a pin 50 carried by the piston 51 and adapted for reciprocating movement in the bore. This cylinder block 45 is formed with a bore 52 providing a bearing surface for the free end of the steering arm 53 carried by the spindle and stub axle unit 54.

The arm is provided with an enlarged head 55 slotted transversely as indicated at 56 which slidably receives the pin 50. A lock nut and washer 57 serves to prevent disengagement of the operating arm from the pin 50. Suitable nipples 58 are mounted in opposite ends of the unit and communicate with the cylindrical bore at opposite sides of the piston 51 for suitably connecting the control unit with the operating unit through the medium of the hose connections 23. The reciprocation of the piston within the cylinder of the operating unit will produce the necessary operation of arm 53 for controlling the steering of an automobile in an efficient manner. This construction of the steering gear operating mechanism has more efficient stress equalizing features than the structure shown in Fig. 1, in view of the relative angular relation between the direction of application and distribution, in addition to the relation of the mounting of the cylinder on the axle which serves to distribute a large portion of the stress directed to the axle.

It will therefore be seen that a highly efficient, hydraulic steering mechanism has been provided, and it is to be understood that various changes in the relation of the parts for carrying the invention in practice, may be made without departing from this invention, as herein claimed.

Having thus described my invention, what I claim as new is:—

1. A hydraulic steering mechanism for motor vehicles, including a control means having a cylinder, a piston reciprocable in said cylinder, fluid conduits for connecting the cylinder with a steering mechanism actuating means, and a rotary operating means provided with a gear connection to said piston, and adapted to operate said piston in the cylinder for producing a direct operation of the steering gear.

2. A hydraulic steering mechanism for motor vehicles, including a control means for a fluid actuated means including a cylinder block having a cylindrical bore therein, a piston reciprocable in said cylindrical bore, a steering column mounted in said cylinder block, a manually rotatable steering rod in said steering column, a gear connection between said steering rod and said piston and housed in a recess in said cylinder block, and fluid conduits connecting said cylinder block with said actuated means.

In testimony whereof I affix my signature.

ROBERT L. FRANCIS.